United States Patent [19]

Heberle et al.

[11] 3,739,090

[45] June 12, 1973

[54] PROCESS AND CIRCUIT ARRANGEMENT FOR REPRODUCTION OF A SLOWLY TRANSMITTED PICTURE IN VIDEO TELEPHONY

[75] Inventors: Wolfgang Heberle, Munich; Siegfried Guntersdorfer, Sauerlach; Peter Klein, Gauting, all of Germany

[73] Assignee: Siemens Aktiengesellschaft, Berlin and Munich, Germany

[22] Filed: July 6, 1971

[21] Appl. No.: 159,994

[30] Foreign Application Priority Data

July 6, 1970 Germany .................. P 20 33 441.2

[52] U.S. Cl. ......... 178/6.8, 178/DIG. 3, 179/2 TV, 315/12

[51] Int. Cl. .......................... H04n 7/12, H04n 7/18

[58] Field of Search ....................... 178/6.8, DIG. 3; 315/12

[56] References Cited

UNITED STATES PATENTS

| | | | |
|---|---|---|---|
| 3,600,510 | 8/1971 | Owen et al. | 178/6.8 |
| 3,061,670 | 10/1962 | Oster et al. | 178/DIG. 3 |
| 3,453,384 | 7/1969 | Donner et al. | 178/6.8 |
| 3,401,299 | 9/1968 | Crowell | 178/DIG. 3 |
| 3,359,365 | 12/1967 | Kihara | 178/DIG. 3 |

*Primary Examiner*—Howard W. Britton

*Attorney*—Harold J. Birch, John R. Swindler, Edward F. McKie, Jr. et al.

[57] ABSTRACT

A process and apparatus are described for flicker-free reproduction, e.g., over a narrow band channel, of a slowly transmitted video telephony picture in which received picture signals are stored and repeatedly made visible on a display screen. The picture storage takes place in a storage tube in which, at the reading out of a given picture signal, the memory at this location is erased. For picture reproduction on a display screen each line stored in a storage plate of the storage tube is read out at high speed, and the picture signals, so obtained, are simultaneously portrayed on the display screen of a picture tube and recorded in an intermediate memory. Subsequently, the signals delayed by the intermediate memory are re-recorded at the same location of the previously read-out line. Thereafter, the next and all further stored lines of each picture are successively read out, reproduced, intermediately stored and re-recorded back in the picture storage tube in the same manner.

6 Claims, 5 Drawing Figures

PROCESS AND CIRCUIT ARRANGEMENT FOR REPRODUCTION OF A SLOWLY TRANSMITTED PICTURE IN VIDEO TELEPHONY

BACKGROUND OF THE INVENTION

For the transmission of a picture over a narrow band connection path, for example, over a telephone line, the picutre is broken down in a known manner into many picture points or segments. However, because of the characteristics of the connection path, these picture points are transmitted to the receiver at a slower speed ("bandwidth compression") and received there in a memory, which is then read out as often as necessary for a flicker-free picture reproduction on a display screen, for example, 25 complete pictures per second. If only one single unchanging picture is to be shown, then after the transmission of the complete picture to the picture memory, the connection path can be released and utilized for other connections. For moving pictures generally two identical picture memories are put into operation in the receiver, and in these picture memories the incoming pictures are alternately received. During this time, the picture from the other memory is read out and reproduced on the display screen.

Storage tubes, magnetic plates, magnetic tape, etc. are usually used as picture memories. The storage tubes, which are of interest here, can be so constructed that their contents can be read out without being destroyed, or so that the stored picture contents are erased in reading.

The invention concerns a process and a circuit arrangement for carrying out this process for flicker-free reproduction of a slowly (for example, over a narrow band connection path) transmitted video telephone picture, in which the received picture signals are stored and thereafter repeatedly made visible on a picture screen, whereby the picture storage takes place in a storage tube, and in which at the reading out of the given picture signal the memory at this location is erased. The type of picture pick-up, i.e., with a camera, and picture transmission is of no interest in the context of a description of this invention and is therefore not described in detail.

It is an object of the invention to make possible the utilization of picture storage tubes, the stored contents of which are erased in being read out, such as picture memories which can be read out any number of times.

SUMMARY OF THE INVENTION

The aforementioned and other objects are achieved according to the invention in that for the reproduction of a picture on a picture screen each of the lines stored in the storage plate of the picture storage tube is read out at the required high speed. The picture signal so obtained is simultaneously portrayed on the picture screen of a reproducing tube (picture tube) and recorded in an intermediate memory. Subsequently, the signal, delayed by the intermediate memory, is rerecorded at the same location of the previously read out line. Thereafter, the next and all further lines of each picture are successively read out, reproduced, intermediately stored and re-recorded back in the picture storage tube in the same manner.

Since the read out picture signals are recorded in an intermediate memory, they are not lost, but rather are available for re-storing.

The reading out and re-recording is undertaken line by line. This has the advantage that only a single inexpensive line memory (for example, a running time memory) is required and no additional large memory, in which a complete picture could be stored, is necessary. This process will be principally utilized in cases in which a storage tube is present, which, however, cannot be repeatedly read out.

The picture signals are regenerated again and again by the re-recording, so that in a stationary picture representation the picture can be repeated any number of times without the necessity of transmitting a second time over the connection path.

A further development of the invention envisions that with the rerecording of each line in the picture storage tube, the picture signals therein are reproduced again in the same line or in the neighboring intermediate line of the picture screen. This has the advantage that for the representation of an equivalent number of picture points on the picture screen per unit of time, only half the number of line scans are necessary. If, however, the number of line scans is not reduced, then there results a greater flicker-free quality in the reproduction on the picture screen.

According to one embodiment of the invention, the picture storage tube developed as a two ray tube has a special input for the storing of the received picture signals, while the re-recording of the picture signals coming from the intermediate memory takes place of another input. This has the advantage that only the picture signals, which are continually maintained in the most recent state can be seen on the picture screen. The invention is thereby also suitable for the transmission of moving pictures without a second memory tube being additionally necessary. In addition, the modified portions of the picture are visible sooner than with two memories which first switch from one memory to the other after the reception of a complete picture.

BRIEF DESCRIPTION OF THE DRAWINGS

The invention will be best understood by reference to a description of a preferred embodiment given hereinbelow in conjunction with the drawings in which.

DETAILED DESCRIPTION OF THE DRAWINGS

In video telephony, in which for example, a process can be utilized in which each subscriber unit is equipped with a pick-up camera S, for example, a Vidicon, and a picture reproduction tube of known construction having a picture screen B. For transmission of a picture from a central archive (for example, from an automatic information file), the pick-up camera S is not required. It can, therefore, be utilized for picture storage, so that further memories, other than a line memory ZS, are superfluous. This line storage unit can be a conventional delay unit, and, for example, can be constructed in the manner of the delay unit 10 in U.S. Pat. No. 3,600,510. The stored picture can, however, not be read out from the pick-up camera S without being destroyed, because in scanning a picture for the purpose of transmitting it to another unit, it simultaneously erases the picture with the scanning electron beam.

In the utilization of such a camera tube for the storage of a picture according to the invention, the following operations take place.

Figure 1:
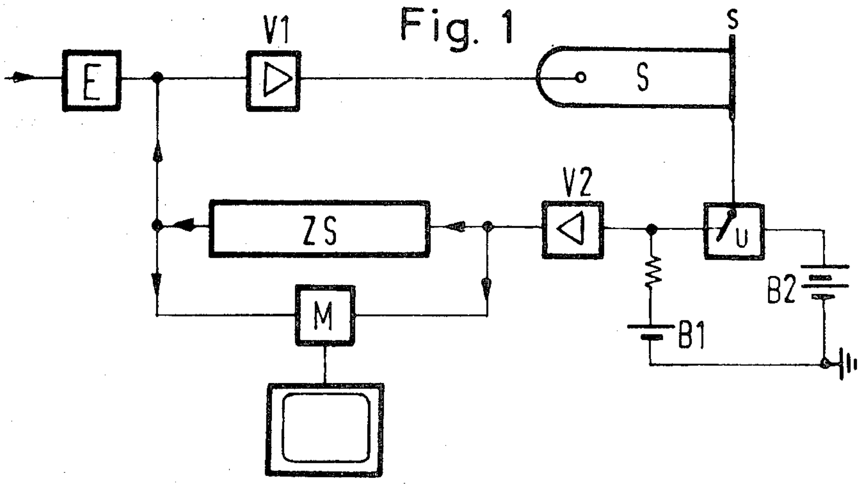
FIG. 1 is a schematic diagram of a preferred embodiment of the inventive apparatus for flicker-free reproduction of a picture.

Before the reception of the picture, the storage layer *s* of the tube S is brought to cathode potential during the course of one picture time by the electron beam of the tube. Thereafter, the change over switch U is brought to its right position shown in FIG. 1, so that in place of the previous potential which corresponds to that of battery B1, the much larger potential of the battery B2 is applied to the storage place *s*. While the incoming picture signal is brought over the receiver E and the recording amplifier V1 to the cathode of the picture tube S, the deflected electron beam generates a positive charge picture in the known manner on the surface elements of the storage layer *s*. The receiver and the reading and recording amplifiers are of known construction, and any of the known varieties customarily used for such an application may be used herein. An example of a suitable receiver would be the demodulator 31 in U.S. Pat. No. 3,061,670, and suitable amplifiers are described in the same patent and referred to therein by the reference numerals 20, 21, 34, 14 and 32.

For reading out, the change-over switch U is switched back again to the left, so that the potential of the battery B1 is applied to the storage plate s of the tube S.

The picture signals obained in the scanning pass over the change-over switch U and the amplifier V2 on the one hand to the intermediate memory ZS, in which a line is stored, and on the other hand to the mixing device M, from which the picture signals are given to the reproducing tube (picture tube) and made visible on the picture screen B.

As soon as the picture signals of one line are stored in the intermediate memory ZS, the change-over switch U switches back again to the battery B2. The contents of the intermediate memory ZS are read out and passed through the recording amplifier V1 to the tube S for re-recording in the same line which was just read out. At the same time, the picture signals from the intermediate memory ZS are also passed to the mixing device M and from there to the picture tube, in which they are reproduced again a second time either in the same line as before or in the intermediate line between that same line and the next following line.

In the same manner, the next line of the storage plate s in the tube S is scanned, reproduced on the picture screen, intermediately stored in the intermediate memory ZS, thereafter once again reproduced on the picture screen B and simultaneously re-recorded in the just erased line in the tube S. The same process repeats as many times per picture as there are lines which are read out of the storage plate *s*.

After the reproduction of a complete picture on the picture tube B, the storage plate is scanned in the same manner as often and as long as the video subscriber desires to view the picture.

Figure 2:
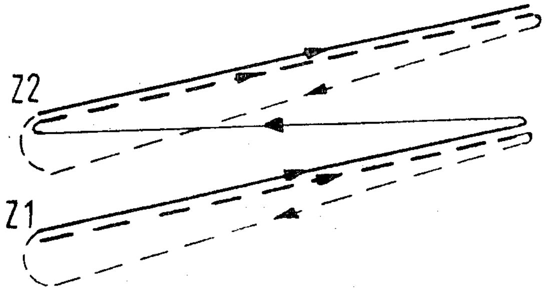
FIG. 2 is a diagram of the path of an election beam in memory picture tube of the FIG. 1 embodiment.
Figure 3:
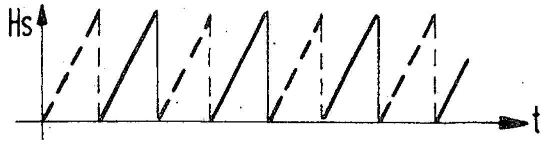
FIGS. 3 and 4 are diagrams of deflecting potentials, which lead to the movements of the electron beam according to FIG 2.
Figure 4:
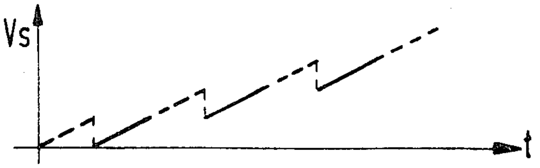

When the horizontal deflection of the electron ray of the tube S is undertaken according to FIG. 3, and the vertical deflection is undertaken according to FIG. 4, then the electron beam traverses a distance on the storage plate, as shown in FIG. 2. In these three figures, the thick broken line represents the reading out from the storage plate, the thin broken line the return path of the electron beam to its initial position, the thick unbroken line the re-recording on the storage plate and the thin unbroken line the return path of the electron ray to the starting point of the next line.

If one begins with the starting point at the left of the line Z1, then it can be seen from FIG. 2 that firstly this line is scanned, as previously described, with the required picture reproduction speed. The electron beam returns with increased speed from the end of this line back to its starting position and gain passes with the same speed over the line Z1. Thereby the picture signals, which now come from the line memory ZS, are recorded in the same line.

As soon as this operation is completed, the electron beam jumps to the start position of the line Z2, from where this line is read out and after the return of the electron beam the picture signals are again recorded. This operation repeats for all lines of the storage plate.

On the picture screen B, the electron beam travels approximately the same distance, whereby, however, the picture signals are reproduced during the reading out as well as also during the recording in the tube S. As previously described, these picture signals can be made visible in the same line in both cases or, on the other hand, they can be made visible between the lines Z1 and Z2 during the recording (in tube S).

To this point, only the reproduction of a stationary picture has been described. In case another identical or similar tube S is available as a second memory, it is possible also to represent moving pictures on the picutre screen by utilizing the common line memory Zs.

Figure 5:
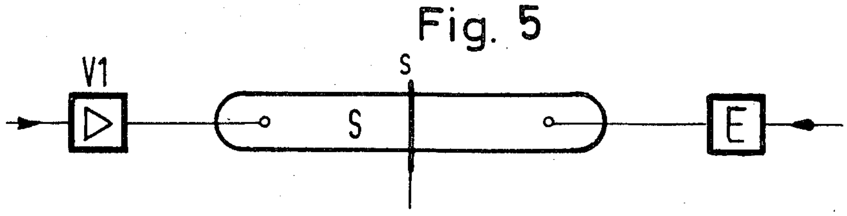
FIG. 5 is a schematic diagram of a circuit arrangement of a two-beam picture tube S, with which moving pictures can be reproduced by the application of the same process.

If one takes a tube S according to FIG. 5, then this second memory can be eliminated. As represented here, in contrast to FIG. 1, the recording amplifier V1 is utilized only for the re-recording of the picture read out from the storage plate. The reception of the transmitted picture signal takes place in contrast thereto through the device E and through a second electron beam of the tube S. Thus, while the right electron beam continuously modifies the picture appearing on the storage plate to the most recent state, the storage tube S is read out by the left electron beam and the intermediately stored picture signals are newly re-recorded, as described with reference to FIG. 1.

In the example of the invention, it is stated that the picture signals read out from the storage plate *s* are intermediately stored in a line memory ZS. This line memory can, however, also be reduced to a point memory or a point group memory, if storage tubes S and picture tubes with sufficiently fast ray deflection or with point by point control are available. In one case, the electron beam travels the same distance, as described, and is only scanned at the point of interest or the point group. In another case (for example, with the utilization of a fixed body matrix), the electron beam is deflected directly to the given point in order to undertake the scanning and re-recording at that location.

The preferred embodiment of the invention described hereinabove is only exemplary and not intended to define the scope of the invention. The scope of the invention is defined by the appended claims.

We claim:

1. A process for flicker-free reproduction of a slowly transmitted video telephony picture in which received picture signals are stored and thereafter repeatedly made visible on a display screen wherein a storage tube is utilized for picture storage, comprising the steps of:

reading out, at relatively high speed, for picture reproduction, each scanning line stored in a storage plate of said storage tube, simultaneously portraying on a display screen of a picture tube and recording in an intermediate memory the scanning line picture signal obtained by said reading out step, re-recording said picture signal, delayed by said intermediate memory, in the same location as said previously read-out picture signal and successively reading out, reproducing, intermediately storing and re-recording further scanning lines.

2. The process defined in claim 1 comprising the additional step of:

reproducing the picture signals of each scanning line on said display screen in one of the same line and a neighboring intermediate line during said re-recording step.

3. The process defined in claim 1 wherein only a portion of a given scanning line is stored in said intermediate memory, said intermediate memory being a point memory.

4. Video reproduction apparatus, comprising:

storage tube means having at least one storage plate in which the stored picture signals are erased upon being sampled, a first voltage source of relatively high potential, means connecting said first voltage source to said storage plate during the recording of a picture signal therein, a second voltage source of relatively lower potential, means connecting said second voltage source to said storage plate during the reading of a picture signal therefrom, intermediate memory means to which said storage plate is connected during the reading out of a picture signal, a display screen, mixing means for preparing scanned picture signals for reproduction on said display screen and means connecting said storage plate to said mixing means during reading out of picture signals from said storage plate.

5. The apparatus defined in claim 4 wherein the output of said intermediate memory is connected to said mixing device and to said storage tube.

6. The apparatus defined in claim 4 wherein said storage tube is a two beam tube having an input for recording received picture signals on said storage plate.

* * * * *